United States Patent
Li et al.

(10) Patent No.: US 11,764,619 B2
(45) Date of Patent: Sep. 19, 2023

(54) WIRELESS CHARGING METHOD AND WIRELESS CHARGING DEVICE WITH NFC DETECTION OPERATION FOR PREVENTING DAMAGE TO NFC CARD

(71) Applicant: Delta Electronics (Shanghai) Co., Ltd., Shanghai (CN)

(72) Inventors: Bin Li, Shanghai (CN); Shengyi Yang, Shanghai (CN); Yayu Li, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/808,535

(22) Filed: Jun. 23, 2022

(65) Prior Publication Data

US 2023/0028305 A1 Jan. 26, 2023

(30) Foreign Application Priority Data

Jul. 22, 2021 (CN) .......................... 202110831356.X

(51) Int. Cl.
*H02J 50/60* (2016.01)
*H02J 50/10* (2016.01)
*H04B 5/00* (2006.01)

(52) U.S. Cl.
CPC .............. *H02J 50/60* (2016.02); *H02J 50/10* (2016.02); *H04B 5/0037* (2013.01)

(58) Field of Classification Search
CPC .............. H02J 50/00; H02J 50/60; H04B 5/00
See application file for complete search history.

(56) References Cited

U.S. PATENT DOCUMENTS

| | | | |
|---|---|---|---|
| 10,530,426 B2 | 1/2020 | Park | |
| 2016/0322853 A1* | 11/2016 | Porat | H04B 5/0037 |
| 2017/0294798 A1* | 10/2017 | Yuk | H04B 5/0037 |
| 2017/0331317 A1* | 11/2017 | Wh | H02J 50/80 |

(Continued)

FOREIGN PATENT DOCUMENTS

| | | |
|---|---|---|
| CN | 104052164 A | 9/2014 |
| CN | 104584449 A | 4/2015 |
| CN | 109560621 A | 4/2019 |

*Primary Examiner* — Adi Amrany
(74) *Attorney, Agent, or Firm* — CKC & Partners Co., LLC

(57) ABSTRACT

The disclosure provides a method for supplying power to a power receiving device, comprising performing a wireless charging function comprising a first detection operation for transmitting a detection signal to detect the power receiving device; and a wireless communication function comprising a second detection operation for detecting a wireless communication tag; wherein the first detection operation comprises periodically transmitting a first group of detection signals and a second group of detection signals each comprising a plurality of detection signals, there is no other detection signal transmitted between transmission of the first group of detection signals and transmission of the second group of detection signals, and the second detection operation is performed between transmission of the first group of detection signals and transmission of the second group of detection signals. The disclosure further provides a wireless charging device for performing the wireless charging method.

14 Claims, 10 Drawing Sheets

(56) References Cited

U.S. PATENT DOCUMENTS

| | | | |
|---|---|---|---|
| 2017/0366232 A1* | 12/2017 | Lee ......................... | H02J 50/80 |
| 2019/0140469 A1* | 5/2019 | Lee ......................... | H02J 50/10 |
| 2019/0148966 A1* | 5/2019 | Choi ....................... | H02J 50/80 |
| | | | 307/104 |
| 2020/0099417 A1* | 3/2020 | Park ..................... | H04B 5/0037 |
| 2021/0265867 A1* | 8/2021 | Park ..................... | H04B 5/0031 |
| 2023/0035613 A1* | 2/2023 | Yang ....................... | H02J 50/80 |

\* cited by examiner

WIRELESS CHARGING METHOD AND WIRELESS CHARGING DEVICE WITH NFC DETECTION OPERATION FOR PREVENTING DAMAGE TO NFC CARD

CROSS-REFERENCE TO RELATED APPLICATIONS

This non-provisional application claims priority under 35 U.S.C. § 119(a) on Patent Applications No. 202110831356.X filed in P.R. China on Jul. 22, 2021, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The disclosure relates to the field of wireless charging, and specifically, to a wireless charging method for supplying power to a power receiving device and a wireless charging device for performing the wireless charging method.

BACKGROUND

The wireless charging technique becomes mature after more than ten years of development, and application also becomes extensive. In particular, the current on-board wireless charging gets appreciated by more and more automobile manufacturers. However, under the background that currently, more and more automobile manufacturers use wireless communication tag such as, a Near Field Communication card (NFC card), a Radio Frequency Identification tag (RFID card), or other electronic tags as a car key, in order to protect the NFC card such as the car key from being damaged by an on-board wireless charging device, the on-board wireless charging device often shall have a detection function of the NFC card.

In current application scenarios of the NFC, a power receiving device (e.g., a mobile phone) with NFC function can perform emulation on the NFC card, and application of such emulation card liberates a physical NFC card. Accordingly, in the detection function of the NFC card, the wireless charging device also shall include a function of distinguishing a difference between the physical NFC card and the emulation card. Currently, the relevant techniques can correctly distinguish both, thereby avoiding loss of the wireless charging function due to the emulation card.

In addition, although currently, a part of the power receiving devices such as mobile phone has been integrated with the detection function of the NFC card, cost of the power receiving device is largely increased, and if the mobile phone is further integrated with the emulation card with the NFC function, application of the emulation card also may be affected, so in the market, there are still lots of power receiving devices without the function. Moreover, if the detection function of the NFC card is integrated into the wireless charging device, effective detection and protection of the wireless communication tag can be realized without limiting types of the power receiving device.

Currently, the wireless charging function for the power receiving device and the wireless communication function for communication with the wireless communication tag in the wireless charging device are performed in parallel. Since the wireless charging function and the wireless communication function are coupled outside the function, relatively independent while having no information and state interaction, the wireless communication function does not define detection timing of the wireless communication tag and charging timing of the wireless charging function, and in space, a communication coil for the wireless communication function and a charging coil for the wireless charging function are parallel and overlapped with each other, so the following defects exist:

(1) during wireless charging, strong electromagnetic interference causes detection failure of the wireless communication tag, and cannot judge whether the wireless communication tag is present in the wireless charging field.

(2) since the wireless charging function and the wireless communication function are not performed in time sequence, while a time of placing the wireless communication tag is random, and is completely asynchronous with control logic, a blind zone for detection of the wireless communication tag exists.

(3) if the wireless charging function is compulsorily suspended to detect the wireless communication tag, it obviously causes discontinuity of the charging process, which seriously affects user experience.

Since a wireless charging output power is increased from 5 W to 15W, and continues to be increased to 40 W or more, energy transferred by the charging coil through the electromagnetic field will pose an increasing risk to the wireless communication tag.

Therefore, it is necessary to develop an improved wireless charging method and a wireless charging device capable of solving at least some problems in the current wireless charging technique.

SUMMARY

An object of the disclosure is to solve the problem of incapable of effectively detecting and protecting the wireless communication tag when the wireless charging function is performed.

According to one aspect of the disclosure, a wireless charging method for supplying power to a power receiving device is described, comprising: a wireless charging function comprising a first detection operation for transmitting a detection signal to detect the power receiving device in a wireless charging field; a wireless communication function comprising a second detection operation for detecting a wireless communication tag in the wireless charging field; wherein the first detection operation comprises periodically transmitting a first group of detection signals and periodically transmitting a second group of detection signals, wherein no other detection signal is transmitted between the operation of transmitting the first group of detection signals and the operation of transmitting the second group of detection signals, and each of the first group of detection signals and the second group of detection signals comprises a plurality of detection signals, and the wireless charging method further comprises performing the second detection operation between transmission of the first group of detection signals and transmission of the second group of detection signals.

According to another aspect of the disclosure, a wireless charging device is described, comprising a power transmission unit, a wireless communication unit, and a control unit for controlling the power transmission unit to perform a wireless charging function, and controlling the wireless communication unit to perform a wireless communication function, wherein the wireless charging function comprises a first detection operation for transmitting a detection signal to detect a power receiving device in a wireless charging field; the wireless communication function comprises a second detection operation for detecting a wireless communication tag in the wireless charging field; the first detection operation comprises periodically transmitting a first group of detection signals and periodically transmitting a second group of detection signals, wherein no other detection signal is transmitted between the operation of transmitting the first group of detection signals and the operation of transmitting the second group of detection signals, and each of the first group of detection signals and the second group of detection signals comprise a plurality of detection signals; and the control unit controls the wireless communication unit to perform the second detection operation between controlling the power transmission unit to transmit the first group of detection signals and the second group of detection signals.

Based on the existing software architecture, the disclosure redesigns performing timing of the wireless charging function and the wireless communication function to detect presence of the wireless communication tag in a time gap (idle time) in the normal wireless charging function, and start large power transmission to charge the power receiving device after ensuring that the wireless communication tag is not present in the wireless charging field, and achieve effective protection to the wireless communication tag on the premise of not reducing user experience.

BRIEF DESCRIPTION OF THE DRAWINGS

The exemplary embodiments are described in details with reference to the accompanying drawings, through which the above and other features and advantages of the disclosure will become more apparent.

DETAILED DESCRIPTION

Figure 1:
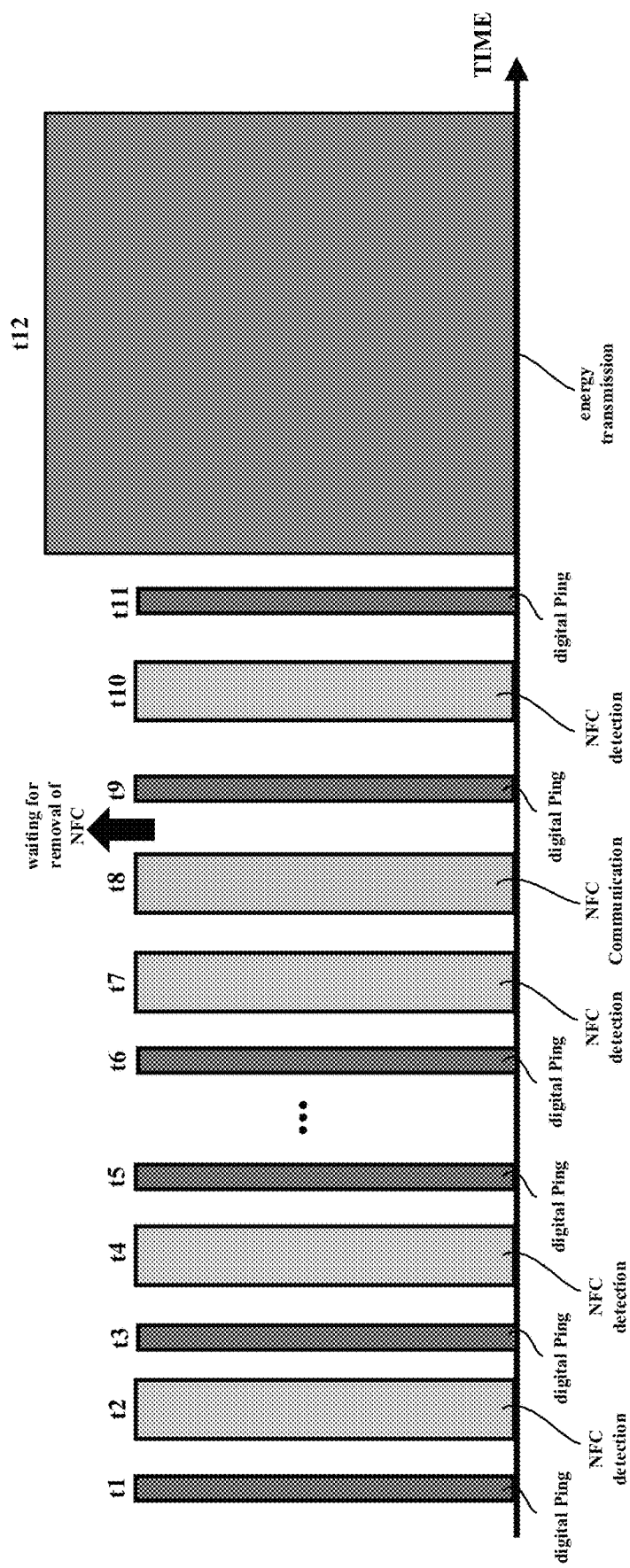
FIG. 1 illustrates a timing diagram of a wireless charging method according to one embodiment of the disclosure.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this disclosure will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. In addition, the terms "first", "second" and the like in the claims are only used as signs, instead of numeral limitations to objects.

The term "wireless charging function" used in the disclosure includes a series of operations from detecting whether wireless charging is present from the power receiving device to the power receiving device. For example, the wireless charging function can include a detection operation of detecting whether the power receiving device such as mobile phone is present in a wireless charging field, an identifying operation of identifying state logic of a wireless charging device, feedback information sent from the power receiving device after the power receiving device is waked up, a registration operation of communication handshake between the power receiving device and the wireless charging device, and a charging operation of transmitting power to the power receiving device at a large power. Moreover, the term "suspending the wireless charging function" used in the disclosure refers to not performing various operations in the wireless charging function, except those operations that have been performed. For example, when the wireless charging function is suspended after the detection operation in the wireless charging function has been performed, the detection operation will not be further performed, and additional identifying operation, registration operation and charging operation will not be further performed, but the performed detection operation is not affected. In addition, the term "restarting the wireless charging function" used in the disclosure refers to continuing to perform various operations in the wireless charging function according to needs. For example, in a case that the wireless charging function is suspended after the detection operation is performed, when the wireless charging function is restarted, if the detection operation is performed and does not detect the power receiving device, the detection operation may be continued after the wireless charging function is restarted; if the detection operation is performed and detects the power receiving device, the operation subsequent to the detection operation may be continued after the wireless charging function is restarted, such as, performing operations of identifying, registration or charging; if the charging operation is performed and detects change of a state of the power receiving device, and suspends the wireless charging function, the detection operation or the identifying operation can be performed again after the wireless charging function is restarted.

The term "wireless communication function" used in the disclosure includes a series of operations from detecting whether a wireless communication tag is present to communication with the wireless communication tag. For example, the wireless communication function can include a detection operation of detecting whether the wireless communication tag such as the NFC card is present in the wireless charging field, and a communication operation of controlling communication between the wireless communication unit and the wireless communication tag.

The core concept of the disclosure is to decompose all relevant operations of the wireless charging function, and interpose execution of the wireless communication function (e.g., the operation of detecting the wireless communication tag and the operation of communication with the wireless communication tag in the wireless communication function) during a gap between various operations of the wireless charging function, thereby ensuring that after the wireless communication tag is not detected in the wireless charging field, the wireless charging function is allowed to start large power energy transmission.

FIG. 1 illustrates a timing diagram of a wireless charging method according to one embodiment of the disclosure. As shown in FIG. 1, during standby of a wireless charging device, the wireless charging device performs a detection step in the wireless charging function, i.e., detecting whether a power receiving device such as mobile phone is present in a wireless charging field by periodically transmitting detection signals.

In some embodiments of the disclosure, the detection signals for detecting whether the power receiving device is present in the wireless charging field can be digital Ping detection signals based on a Qi protocol. A duration time of the digital Ping is 65 ms or more and 70 ms or less, so the duration time of the digital Ping can provide energy that wakes up the power receiving device. After the power receiving device being waken up, the power receiving device transmits an ASK signal as feedback information to the wireless charging device, and the feedback information includes basic information of the power receiving device.

Specifically, as shown in FIG. 1, in the wireless charging method provided by the disclosure, the wireless charging device periodically transmits digital Pings at time such as t1, t3 and t5 to detect whether the power receiving device is present in the wireless charging field, and performs detection operation of a wireless communication tag (e.g., a NFC card) between two adjacent operations of transmitting digital Pings (e.g., a time t2 between the time t1 and the time t3, or a time t4 between the time t3 and the time t5). The operations of transmitting the digital Pings performed at the time t1 and the time t3 are two adjacent operations of transmitting digital Pings, i.e., no other digital Ping is transmitted between the time t1 and the time t3. Accordingly, since the detection operation of the wireless communication tag is performed after the digital Ping is completely transmitted each time, failure of detection of the wireless communication tag caused by interference of the detection operation of the wireless communication tag by the transmitted digital Pings can be avoided.

Further, as shown in FIG. 1, if the NFC card is detected in the wireless charging field during the detection operation of the wireless communication tag performed at the time t7, subsequent operation of the wireless charging function can be suspended. For example, transmission of the digital Pings for detecting the power receiving device may be suspended, but the detection operation of the wireless communication tag is repeatedly performed at a certain time interval, for example, during time period t8, the wireless charging function is always suspended until the NFC card is removed. Only when the NFC card is removed, for example, at a time t9, the wireless charging function is restarted to continue to alternatively perform the operation of transmitting the digital Pings and the detection operation of the wireless communication tag, as shown from the time t9 to a time t11. When the transmitted digital Pings detect the power receiving device, for example, after the digital Pings transmitted at the time t11 detect the power receiving device, subsequent operation of the wireless charging function is performed, and then large power energy transmission is started at a subsequent time t12 to charge the detected power receiving device.

Although FIG. 1 illustrates a charging operation is performed in the time period t12 after the power receiving device is detected at the time t11, it shall be understood that other operations in the wireless charging function also can be performed between the time t11 and at a start time from the time period t12. For example, as is described above, the transmitted digital Pings can wake up the power receiving device, and after the power receiving device being waken up, the ASK signal (feedback information) including the basic information of the power receiving device is transmitted to outside. Therefore, the wireless charging function can further perform a identifying operation for identifying information including feedback information of the power receiving device and state logic of the wireless charging device, and a registration operation of establishing communication handshake between the power receiving device and the wireless charging device based on the identified information (including the feedback information and the state logic) from the time t11 to the time period t12, and start energy transmission to perform a charging operation in the time period t12 after the power receiving device is registered to the wireless charging device.

However, with development of the multi-channel multi-coil wireless charging technique, if the detection operation of the wireless communication tag is added in all gaps between each pair of adjacent digital Pings transmitted by charging coil, since the detection operation of the wireless communication tag shall always consume time, in the case of no wireless communication tag is detected, a time period in which the transmitted digital Pings detect the power receiving device is prolonged, such that a time when the wireless charging device finds the power receiving device is affected, thereby directly affecting user experience.

Regarding these, as compared to the solution of alternatively performing the detection operation of the power receiving device and the detection operation of the wireless communication tag shown in FIG. 1, another embodiment of the disclosure provides a solution grouping the detection signals and performing the detection operation of the wireless communication tag within a time interval between adjacent two groups of detection signals. In the timing diagram of a wireless charging method according to another embodiment illustrated in FIG. 2, periodically transmitting the group of digital Pings within a certain time interval in time periods t1, t3 and t5 to detect whether the power receiving device is present in the wireless charging field, and performing the detection operation of the wireless communication tag (e.g., the NFC card) between the two adjacent operations of transmitting the group of digital Pings (e.g., a time t2 between the time period t1 and the time period t3, or a time t4 between the time period t3 and the time period t5). For example, in the time period t1, the wireless charging device perform operation of transmitting multiple digital Pings to transmit a group of digital Pings in the time period t1, and in the time period t3, the wireless charging device also performs operation of transmitting multiple digital Pings to transmit another group of digital Pings in the period time t3. The operations of transmitting the group of digital Pings performed in the time period t1 and the time period t3 are two adjacent transmitting operations, i.e., no other digital Ping is transmitted between the time period t1 and the time period t3. Accordingly, the detection step of the wireless communication tag is also performed after the digital Pings are completely transmitted, such that failure of detection of the wireless communication tag caused by interference of the detection operation of the wireless communication tag by the transmitted digital Pings can be avoided. Further, since the detection operation of the wireless communication tag is interposed between the operations of transmitting the group of digital Pings, the time when the wireless charging device finds the power receiving device can be shorted, thereby avoiding a detection time interval of the wireless charging device caused after interposition of the detection of the wireless communication tag from too long.

In this embodiment, the number of digital Pings included in each group of digital Pings transmitted can be the same, and also can be different. For example, the number of digital Pings in a first group of digital Pings transmitted in the time period t1 can be the same as the number of digital Pings in a second group of digital Pings transmitted in the time period t3, or the number of digital Pings in a first group of digital Pings transmitted in the time period t1 can be different from the number of digital Pings in a second group of digital Pings transmitted in the time period t3. Moreover, the number of digital Pings in each group of digital Pings may depend on the number of charging coils and/or the number of channels of the wireless charging device. For example, if the number of coils of each charging channel of the wireless charging device is 8, each group of digital Pings may include eight digital Pings. For another example, if the wireless charging device includes two charging channels, and a total number of charging coils is 18, each group of digital Pings may include 18/2=9 digital Pings. However, the number of digital Pings in the multiple groups of digital Pings may not completely the same, but the disclosure is not limited thereto. An object of grouping the digital Pings in the disclosure is to flexibly distribute detection time of the wireless charging device, thereby avoiding reduction of user experience due to long detection time interval of the wireless charging device caused by interposition of detection of the NFC.

Figure 2:
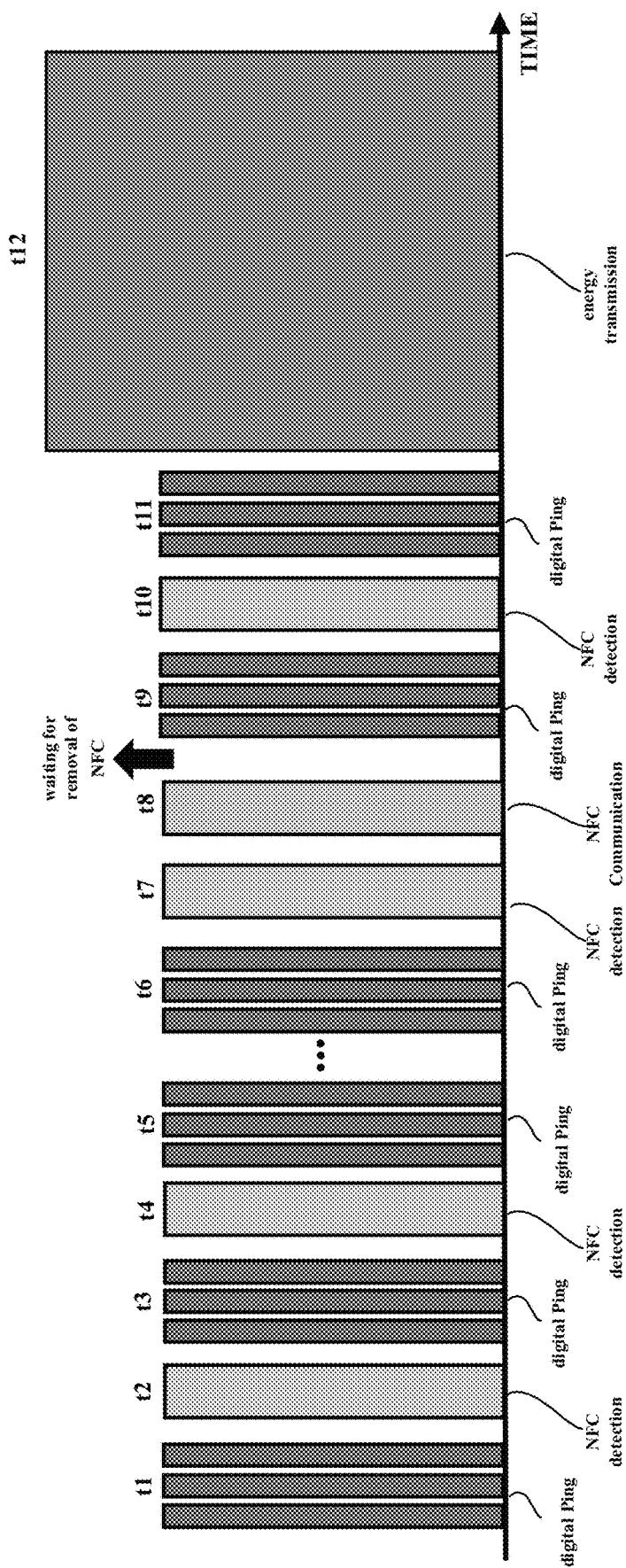
FIG. 2 illustrates a timing diagram of a wireless charging method according to another embodiment of the disclosure.

Further, as shown in FIG. 2, for example, if the NFC card is detected in the wireless charging field during the detection operation of the wireless communication tag performed at the time t7, subsequent operation of the wireless charging function can be suspended. For example, transmission of the group of digital Pings for detecting the power receiving device may be suspended, and the operation of communication with the NFC card in the wireless communication function can be repeatedly performed at a subsequent time period t8 to detect whether the NFC card is present in the wireless charging field. Moreover, before the wireless communication tag (NFC card) is removed, the wireless charging function may be always suspended. Only when the NFC card is removed, for example, in a time period t9, the wireless charging function is restarted to continue to alternatively perform the operation of transmitting the group of digital Pings and the detection operation of the wireless communication tag, as shown from the time (period) t9 to t11. When one digital Ping in the transmitted group of digital Pings detects the power receiving device, for example, after one digital Ping in the group of digital Pings transmitted in the time period t11 detects the power receiving device, subsequent operation of the wireless charging function is performed in a subsequent time period t12, i.e., starting large power energy transmission to charge the detected power receiving device. Similarly, it shall be understood that other operations such as, the identifying operation and the registration operation described above in the wireless charging function also can be performed within a time from the time period t11 to the time period t12.

Figure 3:
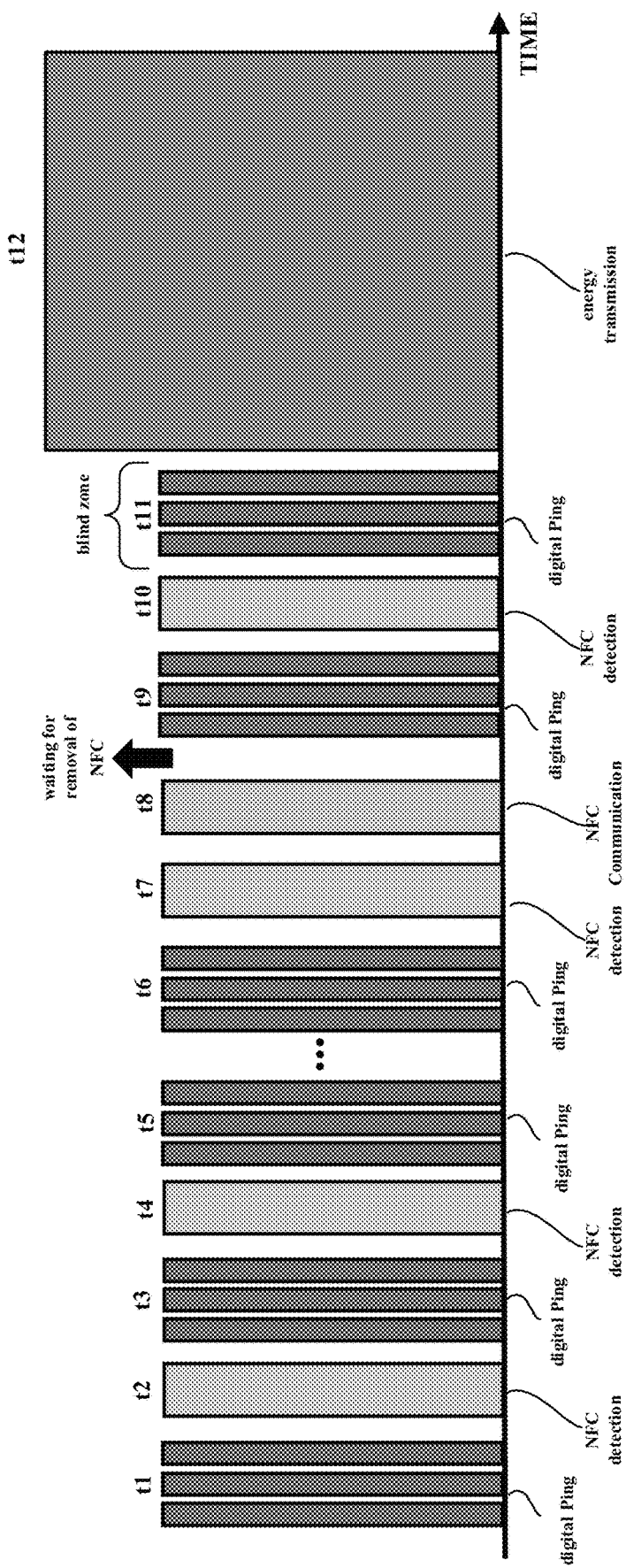
FIG. 3 illustrates defects of the wireless charging method in FIG. 2.

However, the solution of alternatively performing the operation of transmitting the group of digital Pings and the detection operation of wireless communication tag illustrated in FIG. 2 still has a blind zone for detection of the wireless communication tag. As shown in FIG. 3, if the detection operation of the wireless communication tag performed at a time t10 does not detect the NFC card, and then the group of digital Pings is transmitted in the time period t11, at this time, if the power receiving device such as mobile phone and the NFC card are placed in the wireless charging field simultaneously, the digital Pings transmitted at the time t11 will detect presence of the mobile phone, and then the wireless charging function will be directly started to supply power to the mobile phone without performing the subsequent detection operation of the wireless communication tag. At this time, energy supplied by the wireless charging device may damage the NFC card.

Figure 4A:
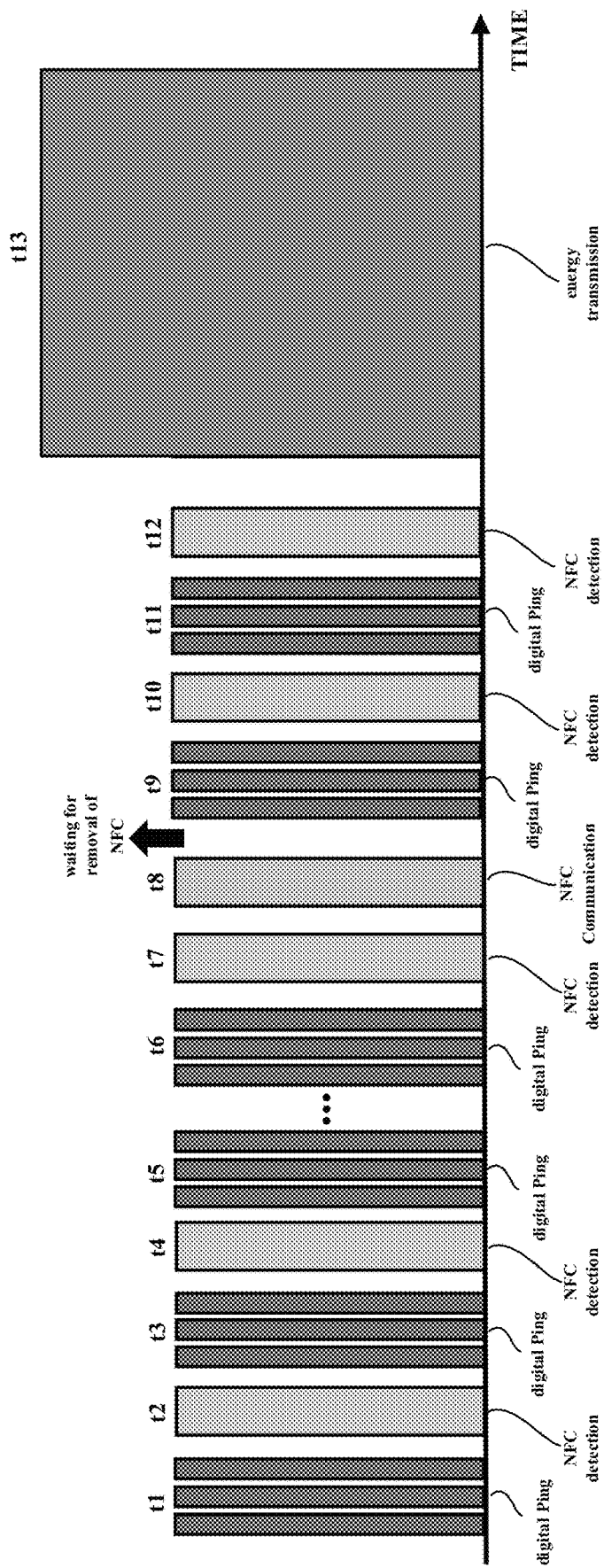
FIG. 4A illustrates a timing diagram of a wireless charging method according to another embodiment of the disclosure.
Figure 4B:
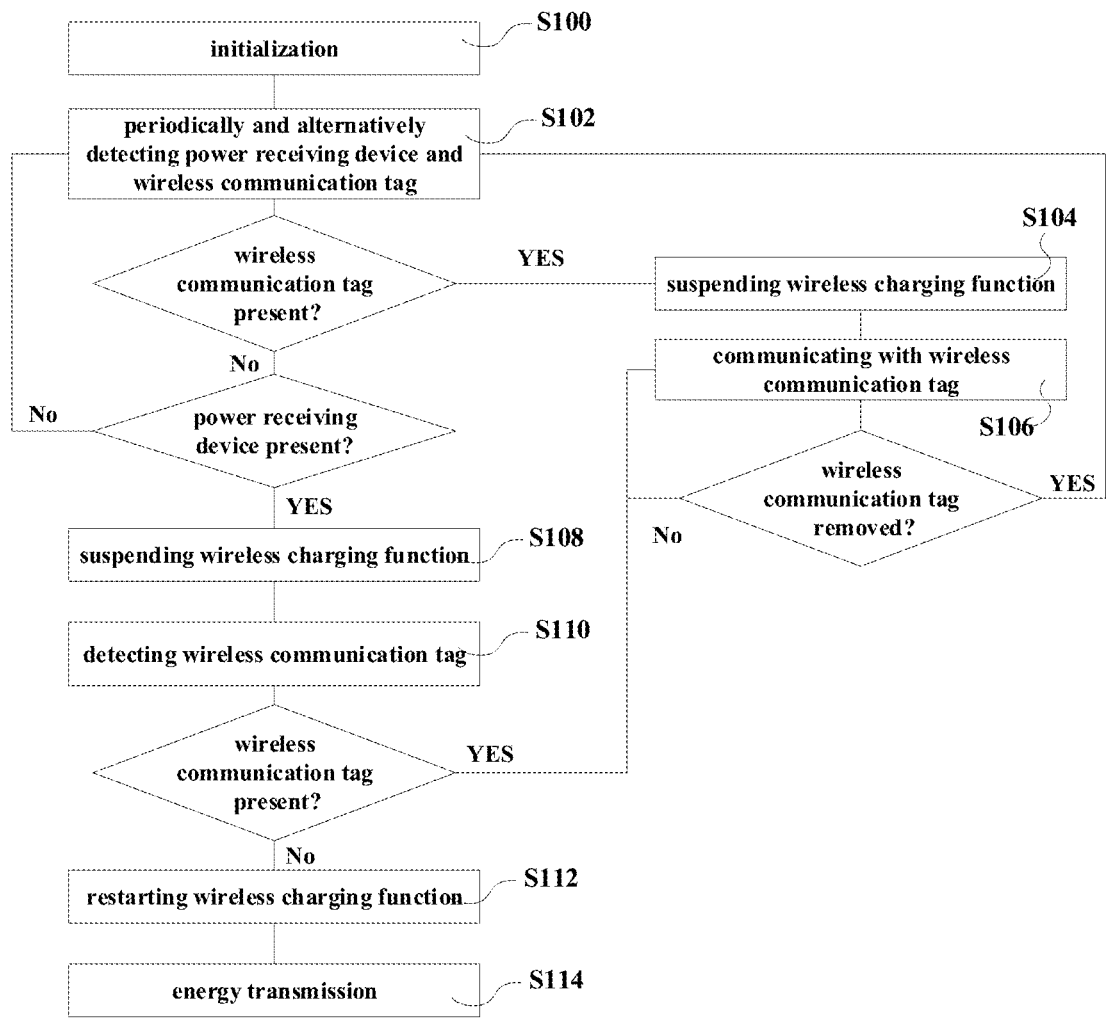
FIG. 4B illustrates a flow chart of the wireless charging method in FIG. 4A.

FIG. 4A illustrates a timing diagram of a wireless charging method according to another embodiment of the disclosure, thereby avoiding the blind zone for detection as discussed above. FIG. 4B illustrates a flow chart of the wireless charging method in FIG. 4A.

The wireless charging method illustrated in FIG. 4A differs from the wireless charging method illustrated in FIG. 2 in: after the transmitted digital Pings detect the power receiving device, instead of immediately starting the wireless charging function to directly power the power receiving device, suspending the wireless charging function (i.e., suspending to transmit energy to the power receiving device, and other pre-operations desired before energy transmission). After the wireless charging function is suspended, the detection of the wireless communication tag is additionally performed. When the performed detection operation of the wireless communication tag detects the wireless communication tag in the wireless charging field, the wireless charging function can be directly terminated, and then other operations of communication with the wireless communication tag are performed. Additionally or alternatively, the wireless charging function also can be temporarily suspended, and information indicative of detection of the wireless communication tag is transmitted to users, in order to restart the suspended wireless charging function when the wireless communication tag is removed. When the performed detection operation of the wireless communication tag does not detect the wireless communication tag in the wireless charging field, subsequent operation of the wireless charging function is started to supply power to the power receiving device.

Referring the wireless charging method described in FIGS. 4A and 4B, the wireless charging method begins from step S100, and in the step S100, an initial operation of the wireless charging device is performed to perform processes such as state initialization, variable initialization and timing initialization of the wireless charging device.

Next, in step S102, the detection operation of the power receiving device and the detection operation of the wireless communication tag are periodically and alternatively performed. For example, as shown from time (period) t1 to t5 in FIG. 4A, in the step S102, the group of digital Pings is periodically transmitted to detect whether the power receiving device is present in the wireless charging field, and the detection operation of the wireless communication tag is performed between two continuous operations of transmitting the group of digital Pings. If the detection operation of the power receiving device and the detection operation of the wireless communication tag performed in the step S102 do not detect the power receiving device and the wireless communication tag, the step S102 is continuously performed.

If the wireless communication tag is detected in the step S102, the wireless charging function is suspended in step S104, i.e., not continuing to transmit the digital Pings, and then step S106 can be performed to communicate with the detected wireless communication tag. At this time, whether the wireless communication tag is removed is detected, and if the wireless communication tag is not removed, the suspending state of the wireless charging function is continued, and communication with the wireless communication tag is continued to continuously monitor whether the wireless communication tag is present in the wireless charging field; if the wireless communication tag is removed, the wireless charging function is restarted, and the method returns to the step S102 to continue to periodically and alternatively perform the detection operation of the power receiving device and the detection operation of the wireless communication tag.

For example, in FIG. 4A, when the NFC card is detected in the wireless charging field during the detection operation of the wireless communication tag performed at a time t7, subsequent operation of the wireless charging function is suspended (step S104). For example, transmission of the group of digital Pings for detecting the power receiving device may be suspended, the detection operation of the wireless communication tag is repeatedly performed through communication with the wireless communication tag in the subsequent time period t8 until the wireless communication tag (the NFC card) is removed, and before the NFC card is removed, the wireless charging function is always suspended. Only when the NFC card is removed, for example, in a time period t9, the wireless charging function is restarted to continue to alternatively perform the operation of transmitting the group of digital Pings and the detection operation of the wireless communication tag (step S102).

If the power receiving device is detected in the step S102, next, the wireless charging function is suspended in step S108, and the detection operation of the wireless communication tag is performed again in step S110. When the wireless communication tag is detected in the step S110, the method jumps to step S106 to continuously suspend the wireless charging function, and determine whether the wireless communication tag is removed through communication with the detected wireless communication tag. When the wireless communication tag is not detected in step S110, the wireless charging function is restarted in step S112 to perform subsequent operation of the wireless charging function, thereby charging the detected power receiving device in step S114.

For example, in FIG. 4A, when one digital Ping in the group of digital Pings in a time period t11 detects the power receiving device, the wireless charging function is suspended (step S108) at a subsequent time t12, and the detection operation of the wireless communication tag is performed once again (step S110). Only when the detection operation of the wireless communication tag performed at the time t12 does not detect the wireless communication tag, the wireless charging function is restarted (step S112) at a subsequent time period t13 to perform subsequent operation of the wireless charging function, thereby starting energy transmission to charge the power receiving device (step S114).

Figure 4C:
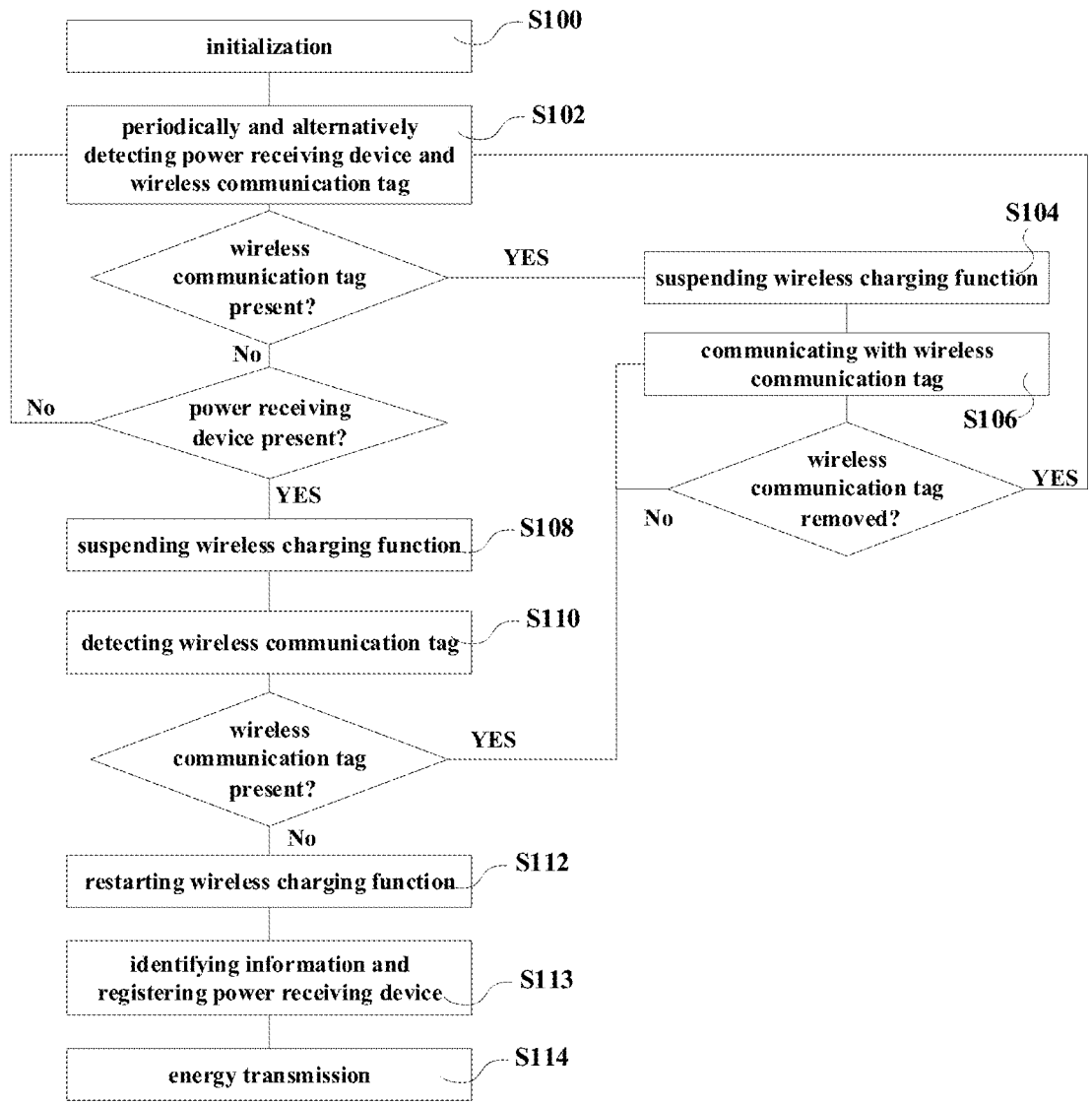
FIG. 4C illustrates a flow chart of the wireless charging method in FIG. 4A.

It shall be noticed that in some embodiments of the disclosure, when the wireless charging function is restarted in the step S112, the wireless charging function can identify feedback information and state logic of the wireless charging device sent from the power receiving device after the power receiving device is waken up before energy transmission, and based on the feedback information and/or the state logic, communication handshake is established between the power receiving device and the wireless charging device, as shown in step S113 of FIG. 4C. After the power receiving device is registered to the wireless charging device, the detected power receiving device is charged in the step S114.

Figure 5A:
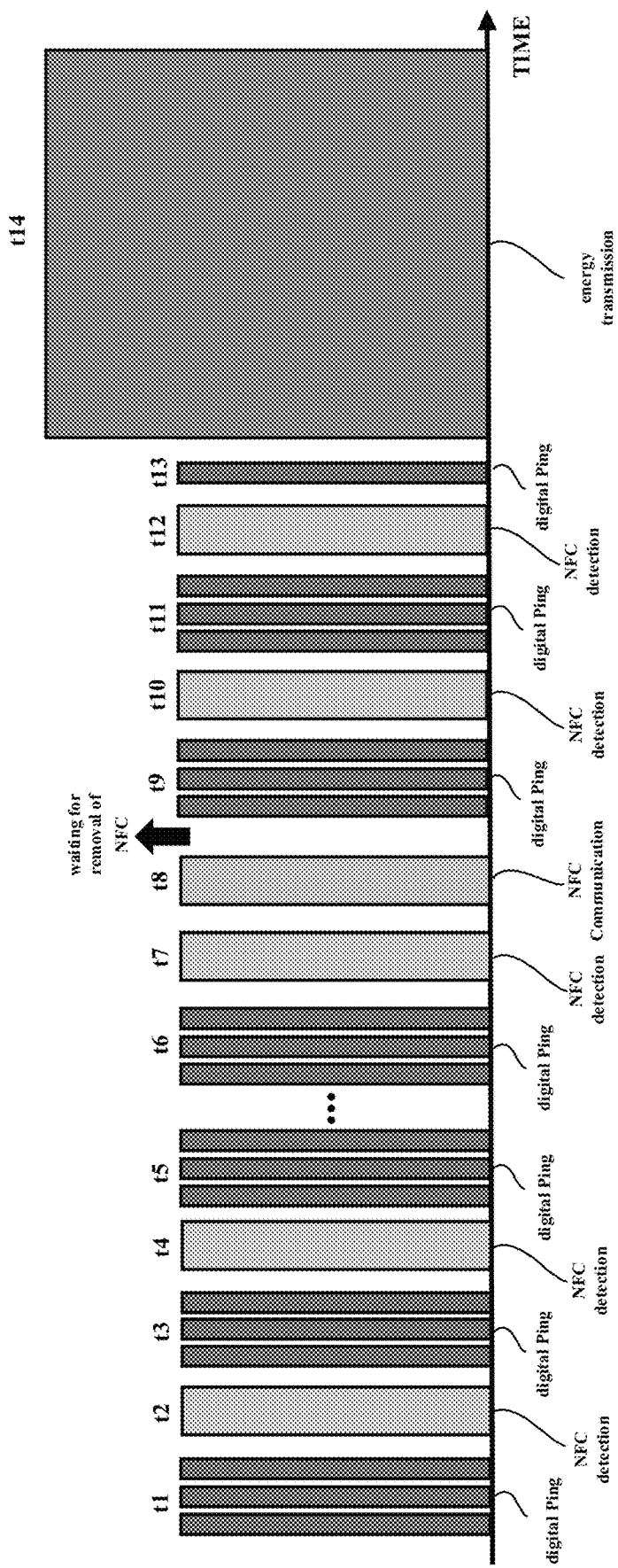
FIG. 5A illustrates a timing diagram of a wireless charging method according to even another embodiment of the disclosure.
Figure 5B:
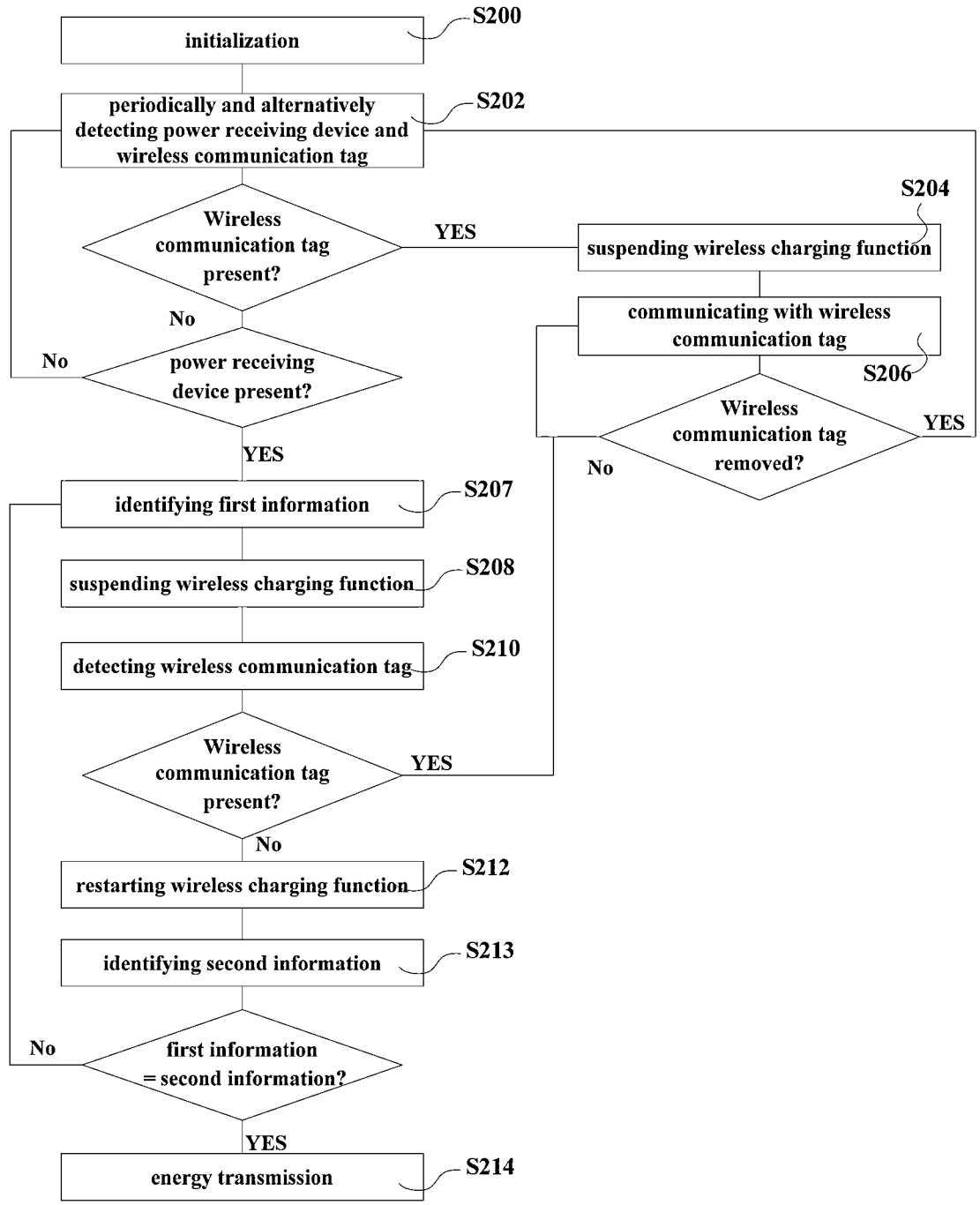
FIG. 5B illustrates a flow chart of the wireless charging method in FIG. 5A.

FIG. 5A illustrates a timing diagram of a wireless charging method according to another embodiment of the disclosure. FIG. 5B illustrates a flow chart of the wireless charging method in FIG. 5A.

Steps S200, S202, S204, S206, S208, S210, S212 and S214 in FIG. 5B are the same as the steps S100, S102, S104, S106, S108, S110, S112 and S114 in FIG. 4B, so the details are not described here.

As shown in FIG. 5B, after the power receiving device is detected in the step S202, and before the wireless charging function is suspended in the step S208, a first feedback information and a first state logic of the wireless charging device transmitted from the power receiving device after the power receiving device is waken up (the first feedback information and the first state logic refer to a first information) are identified using the digital Pings transmitted by the wireless charging device in step S207, and the first information may include various data of the power receiving device. Moreover, when the wireless communication tag is not detected in the step S210, and after the wireless charging function is restarted in the step S212, the digital Ping is transmitted again in step S213, and a second feedback information of the power receiving device in response to the digital Ping and a second state logic of the wireless charging device (the second feedback information and the second state logic refer to a second information) are identified again based on the digital Ping. Next, the first information identified in the step S207 is compared with the second information identified in the step S213, only when the first information and the second information are consistent, the power receiving device is charged in the step S214. Otherwise, it can be considered that the power receiving device detected before and after the detection operation of the wireless communication tag performed in the step S210 changes. At this time, in order to further ensure that the wireless communication tag is not present in the wireless charging field, the method returns to the step S207, replace the newly identified second information with the first information, and suspend the wireless charging function again to detect the wireless communication tag, i.e., repeatedly performing the steps S208 to S213.

For example, in FIG. 5A, when one digital Ping in the group of digital Pings in the time period t11 detects the power receiving device, the first information is identified (step S207). At the subsequent time t12, execution of the wireless charging function is suspended (step S208), and the detection operation of the wireless communication tag is performed once again (step S210). Only when the detection operation of the wireless communication tag performed at the time t12 does not detect the wireless communication tag, the wireless charging function is restarted (step S212) at the subsequent time t13, and the second information is identified by transmitting the digital Pings again (step S213). Subsequently, the first information identified at the time t11 period is compared with the second information identified at the time t13, only when the first information and the second information are consistent, energy transmission is started at the time t14 to charge the power receiving device (step S214).

Another advantage of the wireless charging method in FIGS. 5A and 5BA is that if the second information is not identified in the step S213, it is considered that the originally detected power receiving device is removed, and the method returns to the step S202 to alternatively perform the detection operation of the power receiving device and the detection operation of the wireless communication tag again, thereby avoiding error start of energy transmission.

According to some embodiments combinable with the embodiments of the disclosure, when the charging operation of the wireless charging function is performed, the power receiving device may communicate with the wireless charging device, such that the power receiving device may timely send state data to the wireless charging device, and the wireless charging device may determine that the power receiving device is currently in which charging state based on the received state data of the power receiving device.

For example, according to some embodiments of the disclosure, the charging state data sent from the power receiving device can comprise one or more of a position of the power receiving device in the wireless charging field (i.e., a relative position of the power receiving device and a charging coil), a communication state between the power receiving device and the wireless charging device, a timing state between the power receiving device and the wireless charging device, and power requirement and a charging efficiency of the power receiving device, and the charging state can comprise finding state to be found, waiting for charging state, in-charging state, unchargeable state, and removal state.

Based on the detection operation for detecting the state data of the power receiving device in the wireless charging function, the wireless charging device can be switched among different charging states or hold the current charging state, and determine subsequent operation of the wireless charging function based on the current charging state.

For example, after the wireless charging function is restarted in the step S212 of FIG. 5B, the charging state can be defined to be a finding state. At this time, as is discussed above, the wireless charging device may acquire feedback information of the power receiving device and state logic of the wireless charging device again, and compare the feedback information and the state logic with the previous feedback information and the previous state logic acquired before the wireless charging function is restarted. If inconsistent, the charging state is switched to the unchargeable state, if consistent, the charging state is switched to the waiting for charging state, and if the feedback information is not received, the charging state is switched to the removal state.

For example, if the current state it the waiting for charging state, the wireless charging function may acquire the feedback information of the power receiving device such as a communication state between the power receiving device and the wireless charging device and/or a timing state between the power receiving device and the wireless charging device to determine that the current power receiving device can be charged. If can be charged, it is switched to the in-charging state, and if not, it is switched to the unchargeable state.

For example, if the current state is the in-charging state, the wireless charging function may acquire the feedback information of the power receiving device such as a communication state between the power receiving device and the wireless charging device, and/or a timing state between the power receiving device and the wireless charging device to determine that the current power receiving device can be charged. If the current power receiving device can be charged, the current state is held. If the current power receiving device cannot be charged, it is switched to the unchargeable state. And if the current power receiving device cannot be charged, and it is impossible to communicate with the power receiving device, it is switched to the removal state.

For example, if the current state is the unchargeable state, the wireless charging function may acquire the feedback information of the power receiving device such as a communication state between the power receiving device and the wireless charging device, a timing state between the power receiving device and the wireless charging device, and/or a position of the power receiving device in the wireless charging field to determine reasons why charging quality is reduced. If the reason is the inability to communication with the power receiving device, it is switched to the removal state. If the power receiving device can further continue to charge, it is switched to the in-charging state. And if the power receiving device cannot be charged because the power receiving device changes, the method may return to the step S108 in FIGS. 4B and 4C or the step S208 in FIG. 5B to suspend the wireless charging function before the changed power receiving device is charged, and perform the detection operation of the wireless communication tag to ensure that the wireless communication tag is not present in the wireless charging field before charging again.

For example, if the current state is the removal state, the method may return to the step S102 in FIGS. 4B and 4C or the step S202 in FIG. 5B to periodically and alternatively perform the detection operation of the power receiving device and the detection operation of the wireless communication tag again.

A method of timely switching the charging state is described above according to the state of the power receiving device based on a charging channel. Optionally, when the wireless charging device has a plurality of charging channels, the state of the power receiving device acquired by the respective charging channels can be combined to switch the charging state.

Figure 6A:
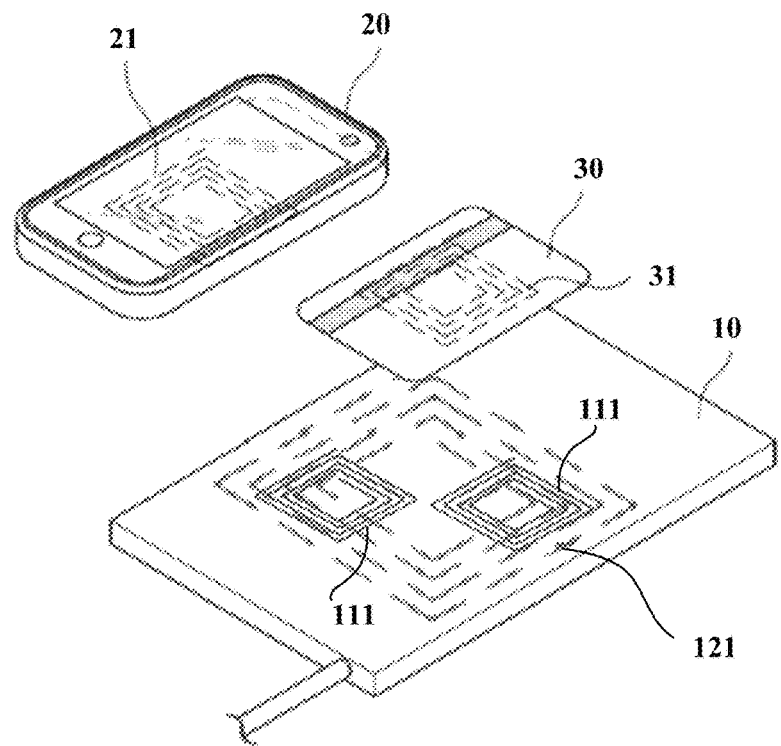
FIGS. 6A and 6B illustrate schematic views of a wireless charging device according to embodiments of the disclosure.
Figure 6B:
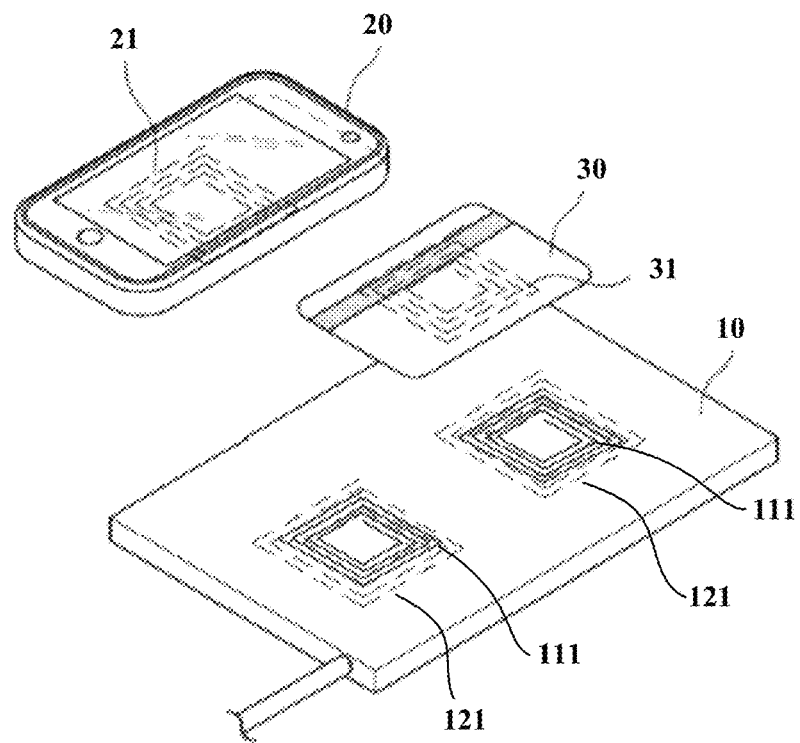
Figure 7:
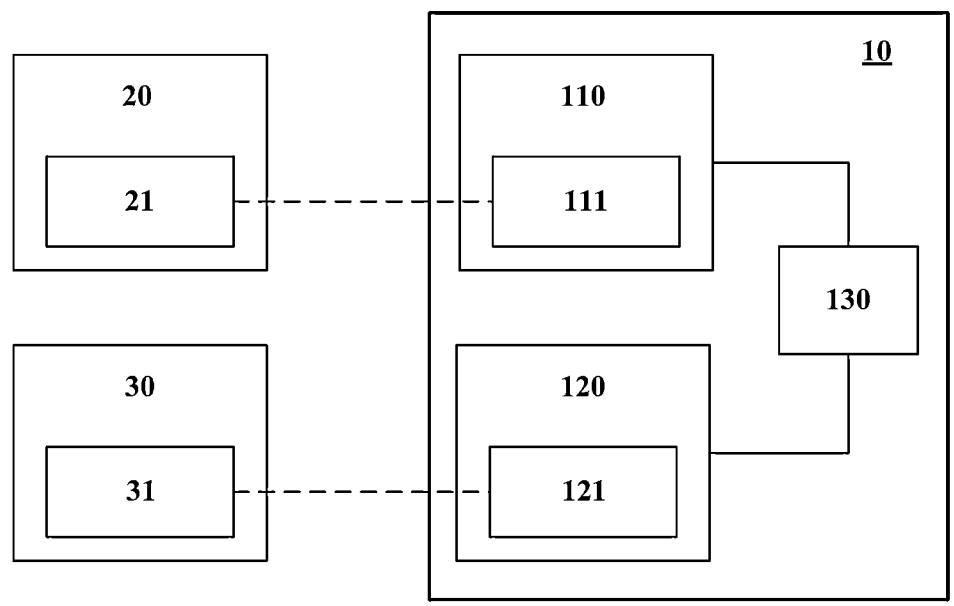
FIG. 7 illustrates a block view of the wireless charging device in FIGS. 6A and 6B.

FIGS. 6A and 6B illustrate schematic views of a wireless charging device 10 according to embodiments of the disclosure. FIG. 7 illustrates a block view of the wireless charging device 10.

In FIGS. 6A, 6B and 7, the wireless charging device 10 comprises a power transmission unit 110, a wireless communication unit 120 and a control unit 130, the control unit 130 is coupled to the power transmission unit 110 and the wireless communication unit 120, and may control the power transmission unit 110 to perform the wireless charging function, and control the wireless communication unit 120 to perform the wireless communication function. The power transmission unit 110 comprises a charging coil 111, and may transmit a detection signal via the charging coil 111 to detect presence of the power receiving device 20 (e.g., mobile phone) in the wireless charging field, and wirelessly transmit power to a receiving coil 21 of the power receiving device 20. The wireless communication unit 120 comprises a communication coil 121 that may communicate with the wireless communication tag 30 (e.g., the NFC card or the RFID card) in the charging field to detect presence of the wireless communication tag 30 in the charging field. Specifically, the wireless communication tag 30 comprises a communication coil 31, and the communication coil 121 of the wireless communication unit 120 may be magnetically coupled to the communication coil 31 of the wireless communication tag 30 to perform information transmission. The charging coil 111 and the communication coil 121 are at least partially overlapped. For example, as shown in FIG. 6A, the wireless charging device 10 has two charging coils 111 and one communication coil 121, and the communication coil 121 is placed above the charging coil 111, and overlapped with the two charging coils 111, or as shown in FIG. 6B, the wireless charging device 10 has two charging coils 111 and two communication coils 121, and each of the two communication coils 121 is placed above the corresponding one of the two charging coils 111, and overlapped with the corresponding charging coil 111.

In some embodiments, the control unit 130 may have a processor and a memory for storing instructions or programs, and when the processor performs instructions or programs on the memory, the processor may control the power transmission unit 110 and the wireless communication unit 120 to perform specific operations.

According to some embodiments of the disclosure, the control unit 130 may control the power transmission unit 110 and the charging coils 111 of the power transmission unit 110 to perform various operation of the wireless charging function in the various wireless charging methods described in FIGS. 1 to 5B, for example, performing a detection operation to determine whether the power receiving device 20 such as mobile phone is present in the wireless charging field, an identifying operation of identifying feedback information and information in state logic of the wireless charging device sent from the power receiving device after the power receiving device is waken up, a registration operation of detecting communication handshake between the power receiving device and the wireless charging device, a charging operation of transmitting power to the power receiving device at a large power, a detection operation of timely acquiring the state of the power receiving device, and an operation of switching the charging state according to the state of the power receiving device, so the details are not described here.

According to some embodiments of the disclosure, the control unit 130 may control the wireless communication unit 120 and the communication coils 121 of the wireless communication unit 120 to perform various operation of the wireless communication function in the various wireless charging methods described in FIGS. 1 to 5B, for example, performing a detection operation for determining whether the wireless communication tag is present in the wireless charging field by controlling the wireless communication unit 120 to communicate with the wireless communication tag 30, so the details are not described here.

To sum up, the disclosure decomposes all relevant operation of the wireless charging function, and interposes the detection operation of the wireless communication tag during a gap between various operations in the wireless charging function, thereby ensuring that after the wireless communication tag is not detected in the wireless charging field, the wireless charging function is allowed to start large power energy transmission to charge the power receiving device. Moreover, the disclosure shortens a time when the wireless charging device finds the power receiving device, and improves user experience by interposing execution of the detection of the wireless communication tag between transmissions of the group of detection signals. Furthermore, after the power receiving device is detected, the disclosure temporarily suspends the wireless charging function, and additionally performs the detection operation of the wireless communication tag, instead of immediately starting the wireless charging function to directly charge the power receiving device, and only when the performed detection operation of the wireless communication tag does not detect the wireless communication tag in the wireless charging field, the wireless charging function is started to power the power receiving device, thereby avoiding the blind zone for detection of the wireless communication tag.

Although the contents are the embodiments of the disclosure, other and further embodiments of the disclosure also can be designed without departing from basic scope of the disclosure, and the scope of the disclosure is determined by the appended claims.

What is claimed is:

1. A wireless charging method for supplying power to a power receiving device, comprising:
   a wireless charging function, comprising a first detection operation for transmitting a detection signal to detect the power receiving device in a wireless charging field, an identifying operation for identifying feedback information of the power receiving device in response to the detection signals and state information of a wireless charging device, a registration operation for registering the power receiving device, and a charging operation for supplying power to the power receiving device;
   a wireless communication function, comprising a second detection operation for detecting a wireless communication tag in the wireless charging field; wherein,
   the first detection operation comprises periodically transmitting a first group of detection signals and periodically transmitting a second group of detection signals, wherein no other detection signal is transmitted between the operation of transmitting the first group of detection signals and the operation of transmitting the second group of detection signals, and each of the first group of detection signals and the second group of detection signals comprises a plurality of detection signals,
   the wireless charging method further comprises performing the second detection operation between transmission of the first group of detection signals and transmission of the second group of detection signals, and
   when the first detection operation detects the power receiving device, the wireless charging method further comprises performing operations of:
   performing the identifying operation to identify a first information;
   suspending the wireless charging function and performing the second detection operation;
   when the wireless communication tag is not detected in the wireless charging field, restarting the wireless charging function to perform the identifying operation to identify a second information;
   when the first information and the second information are the same, performing the registration operation and the charging operation; and
   when the first information and the second information are different, suspending the wireless charging function and performing the second detection operation.

2. The wireless charging method according to claim 1, wherein a number of detection signals included in the first group of detection signals is the same as a number of detection signals included in the second group of detection signals.

3. The wireless charging method according to claim 1, wherein a number of detection signals included in the first group of detection signals is different from a number of detection signals included in the second group of detection signals.

4. The wireless charging method according to claim 1, wherein the wireless charging method comprises performing operations of:
when the second detection operation performed between transmitting the first group of detection signals and transmitting the second group of detection signals detects the wireless communication tag, suspending the wireless charging function until the wireless communication tag is removed.

5. The wireless charging method according to claim 1, wherein the wireless charging function further comprises:
a third detection operation for detecting a state of the power receiving device during power supply to the power receiving device, and determining whether the power receiving device changes and/or the power receiving device is removed according to the state of the power receiving device.

6. The wireless charging method according to claim 5, wherein when the third detection operation detects that the power receiving device changes, the wireless charging method further comprises performing operations of:
suspending the wireless charging function; and
performing the second detection operation.

7. The wireless charging method according to claim 5, wherein when the third detection operation detects that the power receiving device is removed, the wireless charging method further comprises performing operation of:
performing the first detection operation again.

8. The wireless charging method according to claim 5, wherein the state of the power receiving device comprises at least one of:
a position of the power receiving device in the wireless charging field;
a communication state of the power receiving device;
a timing state of the power receiving device; and
a charging efficiency of the power receiving device.

9. A wireless charging device comprising a power transmission unit, a wireless communication unit, and a control unit for controlling the power transmission unit to perform a wireless charging function, and controlling the wireless communication unit to perform a wireless communication function, wherein,
the wireless charging function comprises a first detection operation for transmitting a detection signal to detect a power receiving device in a wireless charging field, an identifying operation for identifying feedback information of the power receiving device in response to the detection signals and state information of the wireless charging device through the power transmission unit, a registration operation for registering the power receiving device to the power transmission unit, and a charging operation for supplying power to the power receiving device through the power transmission unit;
the wireless communication function comprises a second detection operation for detecting a wireless communication tag in the wireless charging field; wherein the first detection operation comprises periodically transmitting a first group of detection signals and periodically transmitting a second group of detection signals, wherein no other detection signal is transmitted between the operation of transmitting the first group of detection signals and the operation of transmitting the second group of detection signals, and each of the first group of detection signals and the second group of detection signals comprises a plurality of detection signals;
the control unit controls the wireless communication unit to perform the second detection operation between controlling the power transmission unit to transmit the first group of detection signals and the second group of detection signals, and
when the first detection operation detects the power receiving device, the control unit is further configured to:
control the power transmission unit to perform the identifying operation to identify a first information;
control the power transmission unit to suspend the wireless charging function, and control the wireless communication unit to perform the second detection operation;
when the second detection operation does not detect the wireless communication tag, control the power transmission unit to restart the wireless charging function to perform the identifying operation to identify a second information;
when the first information and the second information are the same, control the power transmission unit to perform the registration operation and the charging operation;
when the first information and the second information are different, control the power transmission unit to suspend the wireless charging function, and control the wireless communication unit to perform the second detection operation.

10. The wireless charging device according to claim 9, wherein,
when the second detection step performed between transmitting the first group of detection signals and transmitting the second group of detection signals detects the wireless communication tag, the control unit is configured to control the power transmission unit to suspend the wireless charging function until the wireless communication tag is removed.

11. The wireless charging device according to claim 9, wherein the wireless charging function further comprises:
a third detection operation for detecting a state of the power receiving device during power supply to the power receiving device, and determining whether the power receiving device changes and/or the power receiving device is removed according to the state of the power receiving device.

12. The wireless charging device according to claim 11, wherein when the third detection operation detects that the power receiving device changes, the control unit is configured to:
control the power transmission unit to suspend the wireless charging function, and control the wireless communication unit to perform the second detection operation.

13. The wireless charging device according to claim 11, wherein when the third detection operation detects that the power receiving device is removed, the control unit is configured to:

control the power transmission unit to perform the first detection operation again.

14. The wireless charging device according to claim 11, wherein the state of the power receiving device is at least one of:
- a position of the power receiving device in the wireless charging field;
- a communication state of the power receiving device;
- a timing state of the power receiving device; and
- a charging efficiency of the power receiving device.

\* \* \* \* \*